Patented Jan. 12, 1954

2,666,012

UNITED STATES PATENT OFFICE 2,666,012

NOSE DROPS

Edgar A. Ferguson, Jr., Brooklyn, N. Y.

No Drawing. Application October 2, 1950,
Serial No. 188,063

7 Claims. (Cl. 167—58)

This invention relates to a new and improved therapeutic agent for local topical application in the treatment of the mucous membrane when irritated and/or infected incident to common colds, allergic rhinitis, etc., and is more particularly concerned with the production of isotonic nose drops compositions highly useful in the indicated conditions.

It is an object of the invention to produce and provide isotonic nose drops compositions effective to stimulate granulation tissue in the crevices and bruised portions of the nose which occur on the mucous membrane and in the sinuses during infections commonly referred to as colds.

Excessive secretion from the mucous membrane causes great exfoliation, excoriation, bruising, and erythematous irritation of the membrane. The present invention seeks, therefore, to provide compositions effective, upon local topical application, to soothe and stimulate the healing process on the surface of the mucous membrane of the nose and the nasopharnyx, and thus counteract and reduce irritating and caustic nature of the catarrhal exudate associated with the foregoing conditions.

In accordance with the present invention, it has now been discovered that a particular mixture of amino acids and polypeptides may be provided which, when brought into contact with the mucous membrane of the nose and the nasopharnyx in the form of an isotonic water solution, causes the catarrhal exudate to subside and soothes and stimulates the healing process.

It has been determined, further in accordance with the invention, that the usual combination of so-called essential amino acids found in conventional protein hydrolysates is not satisfactory for this purpose. This usual amino acid mixture, which is the result of enzymatic digestion or acid digestion of milk protein or milk casein or yeast proteins, contains argenine, histidine, lysine, tyrosine, tryptophane, phenylalanine, cystine, methionine, threonine, leucine, isoleucine, and valine.

A study of these amino acids separately has shown that some are partly beneficial, some are indifferent in their effect, and some irritate; but none alone are completely satisfactory in mucous membrane therapy. A study made of the effect of solutions of each of these separate amino acids has revealed the following:

| Amino acid | Effect |
|---|---|
| Argenine | Indifferent. |
| Histidine | Slight irritation. |
| Lysine | Indifferent. |
| Tyrosine | Do. |
| Tryptophane | Slightly beneficial. |
| Phenylalanine | Do. |
| Cystine | Slightly irritating. |
| Methionine | Strongly irritating. |
| Threonine | Indifferent. |
| Leucine | Slightly beneficial. |
| Isoleucine | Indifferent. |
| Valine | Slightly beneficial. |

The discovery that certain of the amino acids in the combinattion caused irritation, led to the formation of a novel complex from which significant amounts of methionine, cystine and histidine, together with certain water-insoluble components, have been removed. This novel complex, containing a particular amino acid mixture, along with polypeptides and unreacted proteins, is the basis of the present invention and the essential ingredient of final therapeutic agent.

The active principle of the new therapeutic agent for local application in the treatment of irritated mucous membrances is composed of a specially prepared protein digest containing a particular mixture of amino acids and polypeptides, and is prepared by subjecting a protein such as lactalbumin to conventional hydrolysis, treating the hydrolysate in a special way to remove undesirable amino acids and some of the more water-insoluble fractions of the digested protein, and then further digesting and dehydrating by heat.

The lactalbumin used consists of plain untreated lactalbumin derived from milk. The analysis of the lactalbumin used for the majority of the tests was as follows: protein 82.5%, ash 8.2%, moisture 2.6%, the remainder consisting of certain carbohydrate materials which are eliminated by filtration during the process of hydrolysis.

The initial step in the process consists in the formation of lactalbumin hydrolysate, in a conventional manner, by enzymatic digestion with pork pancreas. The menstruum for digestion consists of a 10% solution of one normal hydrochloric acid. About 1% of comminuted pork pancreas is added to this solution together with about 10% of lactalbumin. This is placed in a water bath and maintained at a temperature of 52° C. for period of 2½ hours with constant agitation. At the end of this time filtration will remove the solid particles and the remainder is spray dried to form a flaky powder of enzyme digested hydrolysate. This initial lactalbumin hydrolysate is a mixture of amino acids and polypeptides along with some protein elements which are undigested. These are expressed by the difference between the total nitrogen content and the amino nitrogen content minus the polypeptide content (approximately 2.5%). The chemical composition is as follows:

|  | Per cent |
|---|---|
| Total nitrogen | 11.5 |
| Amino nitrogen | 7.5 |
| Ash | 4 |
| Moisture | 4 |

The amino acid content of the amino nitrogen is as follows:

|  | Per cent |
|---|---|
| Argenine | 3.5 |
| Histidine | 2 |
| Lysine | 8 |
| Tyrosine | 5.3 |
| Tryptophane | 2.3 |
| Phenylalanine | 5.6 |
| Cystine | 3 |
| Methionine | 2.8 |
| Serine | 4.9 |
| Threonine | 5.3 |
| Leucine | 15 |
| Valine | 4 |
| Alanine | 1 |

It should be understood that other methods of hyrdolysis will yield a mixture of substantially the same analysis when applied to lactalbumin. One such method, as an alternative, is the application of heat to an aqueous acid solution of the lactalbumin. For instance 100 grams of lactalbumin may be added to 200 cc. of water containing 20 cc. of 12 normal hydrochloric acid. The solution is boiled in a reflux condenser for approximately 2 hours. At the end of that time the excess acid is neutralized with sodium hydroxide. The hydrolysate is dried and powdered.

Other proteins will yield products of similar analysis but not the same. For instance, the hydrolysis of yeast protein by enzymes yields a product higher in methionine. This is undesirable because the amount of methionine must be reduced to a very low point before irritation caused thereby is eliminated.

The water solubility of the lactalbumin hydrolysate and polypeptides described above is determined. A solution is then prepared so that all but 10% of the lactalbumin hydrolysate and polypeptides dissolve at room temperature. The range of this solution is from 3.25 to 3.75 grams in 11 cc. of water. The average amount is 3.5 grams in 11 cc. of water. The soultion is allowed to stand at room temperature for 4 hours, after which time it is stored overnight at a temperautre of 50° F. and then decanted. Finally, the solution is filtered on a Büchner funnel with suction. It is at this point that the bulk of the methionine crystals and some of the more water-insoluble fractions of the enzymatic digested proteins have been removed.

The resulting clear filtrate is subjected to further hydrolysis by boiling down in a flat pan over a Bunsen flame to near dryness. The boiling process is carried on at temperature of 110° C. and must be continued for at least 3 hours in order to convert all of the remaining protein residues to polypeptides and amino acids. The final mixture has been shown to be deficient in methionine content, the original 2.8% having been reduced to less than 0.8%. The process lowers the quantity of histidine to approximately 1%, the amount of cystine to approximately 1% and reduces the total amount of unchanged protein substances to a negligible quantity while increasing the polypeptides to at least 3.5%. The amounts of amino acids present after treatment are approximately as follows:

|  | Per cent |
|---|---|
| Argenine | 3.5 |
| Histidine | 1 |
| Lysine | 8 |
| Tyrosine | 5 |
| Tryptophane | 2.3 |
| Phenylalanine | 5.6 |
| Cystine | 1 |
| Methionine | 0.6 |
| Serine | 4.9 |
| Threonine | 5.0 |
| Leucine | 10 |
| Valine | 4 |
| Alanine | 0.1 |

The percentage range of most of these constituents may be varied considerably (50% to 100%) without seriously interfering with the efficiency of the mixture. However, it is desirable to keep methionine as low as possible, between 0.4 and 0.8%. It is also desirable to keep the percentage of histidine below 1%, and the amount of cystine below 1 to 2%. In the final mixture the total nitrogen remains the same, being approximately 11.5%. The amount of amino nitrogen is increased to approximately 8% while the amount of organized protein revealed by Folin's reagent is reduced to less than 1%, demonstrating that the 4% difference between total nitrogen and amino nitrogen is not occupied any longer by organized protein but by additional polypeptides by reason of the boiling process.

When the mixture has boiled for the required time, it is allowed to cool and is then decolorized and deodorized. This is preferably carried out by contact with activated charcoal. Approximately 5 grams of activated charcoal is employed for each 100 grams of hydrolysate. The charcoal, which is preferably of U. S. P. grade, is mixed thoroughly with the hydrolysate and is allowed to stand for approximately ½ hour in an incubator at 38° C. The mixture is then filtered to remove the charcoal. Any remaining odor may be covered by a flavor mask consisting of small amounts of N. F. or U. S. P. menthol, camphor, oil of eucalyptus or oil of thyme, or any mixture thereof.

The protein hydrolysate is then measured for isotonicity by means of a so-called red blood cell fragility test, which has been found the best method available in dealing with a protein. The various cryoscopic methods would not be quite applicable in the case of proteins and, moreover, the fragility test is a direct and physiological test.

The method of testing is as follows: water solutions of the specially prepared hydrolysate were made up in a range from 20% to 0.5%. 5 cc. of each of the solutions were placed in the bottoms of test tubes standing vertically in a rack where there was no vibration or motion. 0.05 cc.

of blood was added to each. The tubes were shaken once to thoroughly mix the blood with the solution. Tubes were returned to the rack and allowed to stand for a period of 20 minutes. Standards were made with distilled water and 0.85% solution of sodium chloride. While standing the solid portions containing cells settled to the bottom in those tubes which were not hemolyzed. In the tubes where partial hemolysis occurred some solid particles settled to the bottom while the supernating fluid was red instead of clear. There was an intermediate layer of cloudy material in partially hemolyzed tubes. Where complete hemolysis occurred the whole tube was red and there was no solid material to settle. Each tube showed three layers, the top layer which was always fluid, the center layer which was a mixture of fluid and cell material and the bottom layer which consisted of agglutinate and cells, all solid.

The results were tabulated as follows:

| Percent | Substance | Top layer (fluid) | | Center (mixture) | | Bottom layer (agglutinate, cells) | |
|---|---|---|---|---|---|---|---|
| | | Color | Consistency | Color | Consistency | Color | Consistency |
| 0 | H₂O | Red | Clear | Red | Clear | Red | Clear. |
| 0.85 | NaCl | Water | do | do | Cloudy | do | Packed. |
| 0.5 | H* | Red | Cloudy | do | do | do | Cloudy. |
| 1.0 | H* | do | do | do | do | do | Do. |
| 2.5 | H* | do | do | do | do | do | Packed. |
| 5.0 | H* | do | Clear | do | do | do | Do. |
| 8.0 | H* | Light red | do | do | do | do | Do. |
| 9.0 | H* | Water | Cloudy | do | do | do | Do. |
| 10.0 | H* | do | Clear | do | do | Brown | Do. |
| 12.5 | H* | Light red | do | do | do | Red | Do. |
| 15.0 | H* | Red | Partly cloudy | do | do | do | Do. |
| 20.0 | H* | do | Cloudy | do | do | do | Do. |

*Specially prepared solution of lactalbumin hydrolysates.

This table demonstrates that 10% solutions of the specially prepared protein hydrolysate are almost perfectly isotonic. The range from 9 to 11% sufficiently protects the red blood cells so that this may be regarded as the range within which isotonicity exists.

While an isotonic water solution of the specially prepared protein hydrolysate may be used per se as the nose drops composition, it should be understood that other substances may be added. This will cause an increase in osmotic pressure, so the increase must be compensated for by a reduction in the amount of hydrolysate used to render the solution isotonic. In solutions in which ephedrine hydrochloride is partly neutralized by sodium bicarbonate, the formation of sodium chloride causes a partial osmotic pressure to be developed. If this were in the order of 0.3% sodium chloride it would be necessary to decrease the amount of hydrolysate by about 3%. It will be noted that the osmotic pressure of 0.1% of sodium chloride is roughly equivalent to 1% of specially treated protein hydrolysate. A typical formula would include some perservative in the form of sodium benzoate, a vasoconstrictor such as ephedrine chloride, a neutralizer such as sodium bicarbonate, and the specially treated protein hydrolysate. Typical water-solution formulas contain the following:

| | Per cent |
|---|---|
| 1. Ephedrine hydrochloride | 1 |
| Sodium bicarbonate | 0.3 |
| Sodium benzoate | 0.1 |
| Specially treated protein hydrolysate | 6.0 |
| 2. Desoxyphedrine | 0.6 |
| Methylparabene | 0.1 |
| Specially treated protein hydrolysate | 9.0 |
| 3. Neosynephrine hydrochloride[1] | 0.5 |
| Sodium sulphite | 0.05 |
| Ethylenediamine | 0.05 |
| Specially treated protein hydrolysate | 10.0 |

[1] Registered trade-mark for levo-meta-methylamino ethanolphenol hydrochloride.

I claim:

1. Nose drops composition which comprises an isotonic solution of the lactalbumin hydrolysate of claim 2 whose amino acid content is approximately as follows:

| | Per cent |
|---|---|
| Argenine | 3.5 |
| Histidine | 1 |
| Lysine | 8 |
| Tyrosine | 5 |
| Trypophane | 2.3 |
| Phenylalanine | 5.6 |
| Cystine | 1 |
| Methionine | 0.6 |
| Serine | 4.9 |
| Threonine | 5.0 |
| Leucine | 15 |
| Valine | 4 |
| Alanine | 0.1 |

2. Nose drops composition which comprises an isotonic solution of lactalbumin which has been subjected to substantial hydrolysis to yield a hydrolysate initially containing organized protein and therapeutically effective amounts of a plurality of free, simple amino acids, including tryptophane, phenylalanine, leucine and valine, specific in their topical application to alleviate symptoms of irritated mucous membrane, admixed with mucous-membrane-irritating amounts of methionine, histidine and cystine, said hydrolysate being subsequently heat-modified to decrease the organized protein content to less than 1%, and reduce said methionine content to the order of 0.4% to 0.8%, the histidine content to below 1% and the cystine content to below 2%.

3. Nose drops composition which comprises an isotonic solution carrying 9% to 11% lactalbumin which has been subjected to substantial hydrolysis to yield a hydrolysate initially containing organized protein and therapeutically effective amounts of a plurality of free, simple amino acids, including tryptophane, phenylalanine, leucine and valine, specific in their topical application to alleviate symptoms of irritated mucous membrane, admixed with mucous-membrane-irritating amounts of methionine, histidine and cystine, said hydrolysate being subsequently heat-modified to decrease the organized protein content to less than 1%, and reduce said methionine content to the order of 0.4% to 0.8%, the histidine content to below 1% and the cystine content to below 2%.

4. Nose drops composition which comprises an isotonic solution carrying about 10% of lactalbumin which has been subjected to substantial hydrolysis to yield a hydrolysate initially containing organized protein and therapeutically effective amounts of a plurality of free, simple amino acids, including tryptophane, phenylalanine, leucine and valine, specific in their topical application to alleviate symptoms of irritated mucous membrane, admixed with mucous-membrane-irritating amounts of methionine, histidine and cystine, said hydrolysate being subsequently heat-modified to decrease the organized protein content to less than 1%, and reduce said methionine content to the order of 0.4% to 0.8%, the histidine content to below 1% and the cystine content to below 2%.

5. Nose drops composition which comprises an isotonic solution of approximately 1% ephedrine hydrochloride, approximately 0.3% sodium bicarbonate, approximately 0.1% sodium benzoate and approximately 6.0% lactalbumin which has been subjected to substantial hydrolysis to yield a hydrolysate initially containing organized protein and therapeutically effective amounts of a plurality of free, simple amino acids, including tryptophane, phenylalanine, leucine and valine, specific in their topical application to alleviate symptoms of irirtated mucous membrane, admixed with mucous-membrane-irritating amounts of methionine, histidine and cystine, said hydrolysate being subsequently heat-modified to decrease the organized protein content to less than 1%, and reduce said methionine content to the order of 0.4% to 0.3%, the histidine content to below 1% and the cystine content to below 2%.

6. Nose drops composition which comprises an isotonic solution of approximately 0.6% desoxyphedrine, approximately 0.1% methylparaben and approximately 9.0% lactalbumin which has been subjected to substantial hydrolysis to yield a hydrolysate initially containing organized protein and therapeutically effective amounts of a plurality of free, simple amino acids, including tryptophane, phenylalanine, leucine and valine, specific in their topical application to alleviate symptoms of irritated mucous membrane, admixed with mucous-membrane-irritating amounts of methionine, histidine and cystine, said hydrolysate being subsequently heat-modified to decrease the organized protein content to less than 1%, and reduce said methionine content to the order of 0.4% to 0.8%, the histidine content to below 1% and the cystine content to below 2%.

7. Nose drops composition which comprises an isotonic solution of approximately 0.5% levo-meta-methylamino ethanolphenol hydrochloride, approximately 0.05% sodium sulfite, approximately 0.05% ethylenediamine and approximately 10.0% lactalbumin which has been subjected to substantial hydrolysis to yield a hydrolysate initially containing organized protein and therapeutically effective amounts of a plurality of free, simply amino acids, including tryptophane, phenylalanine, leucine and valine, specific in their topical application to alleviate symptoms of irritated mucous membrane, admixed with mucous-membrane-irritating amounts of methionine, histidine and cystine, said hydrolysate being subsequently heat-modified to decrease the organized protein content to less than 1%, and reduce said methionine content to the order of 0.4% to 0.8%, the histidine content to below 1% and the cystine content to below 2%.

EDGAR A. FERGUSON, JR.

References Cited in the file of this patent

Ludwig: Repertorium Pharmazeutischer Spezialpraparate 1948 Beobachtes A. S. Basel, pages 523–524.